United States Patent
Kanellakopoulos et al.

(10) Patent No.: US 9,484,984 B2
(45) Date of Patent: Nov. 1, 2016

(54) CABLE-LEVEL CROSSTALK REDUCTION

(71) Applicant: ACTELIS NETWORKS (ISRAEL) LTD., Petach Tikva (IL)

(72) Inventors: Ioannis Kanellakopoulos, Cupertino, CA (US); Amit Priebatch, Kfar Saba (IL); Elad Domanovitz, Mazkeret Batya (IL); Mauricio Nurko, Petach Tikva (IL); Tuvia Barlev, Palo Alto, CA (US)

(73) Assignee: ACTELIS NETWORKS (ISRAEL) INC., Petach Tikva (IL)

( * ) Notice: Subject to any disclaimer, the term of this patent is extended or adjusted under 35 U.S.C. 154(b) by 312 days.

(21) Appl. No.: 14/367,959

(22) PCT Filed: Dec. 23, 2012

(86) PCT No.: PCT/IL2012/050550
§ 371 (c)(1),
(2) Date: Jun. 23, 2014

(87) PCT Pub. No.: WO2013/093926
PCT Pub. Date: Jun. 27, 2013

(65) Prior Publication Data
US 2014/0362677 A1 Dec. 11, 2014

Related U.S. Application Data

(60) Provisional application No. 61/579,916, filed on Dec. 23, 2011.

(51) Int. Cl.
*H04B 3/32* (2006.01)
*H04J 3/10* (2006.01)
*H04M 11/06* (2006.01)

(52) U.S. Cl.
CPC . *H04B 3/32* (2013.01); *H04J 3/10* (2013.01); *H04M 11/062* (2013.01)

(58) Field of Classification Search
CPC .......... H04B 3/32; H04J 3/10; H04M 11/062
See application file for complete search history.

(56) References Cited

U.S. PATENT DOCUMENTS

| 2005/0152385 | A1  | 7/2005  | Ciofee |
|---|---|---|---|
| 2008/0239937 | A1  | 10/2008 | Erickson et al. |
| 2012/0020418 | A1* | 1/2012  | Sands ............... H04B 3/32 375/259 |
| 2014/0269947 | A1* | 9/2014  | Schneider ........... H04B 3/32 375/257 |

FOREIGN PATENT DOCUMENTS

WO    WO 2009/152188    12/2009

OTHER PUBLICATIONS

Search Report of International Application No. PCT/IL2012/050550 mailed on Apr. 2, 2013.

* cited by examiner

*Primary Examiner* — Melvin Marcelo
(74) *Attorney, Agent, or Firm* — Pearl Cohen Zedek Latzer Barataz LLP

(57) ABSTRACT

A device for managing signal transport, on a cable level, in a communication system, and a method for using same, are provided herein. The device is connectable between one or more access multiplexers (e.g., Very-high-speed Digital Subscriber Loop Access Multiplexer (VDSLAM) or a switch) and a cable in said communication system. The device includes: a plurality of access multiplexer-side transceivers connectable to access multiplexer-related physical medium, associated with said one or more access multiplexers; a plurality of customer-side transceivers connectable to respective customer-related wire pairs of said cable; and a processor connected to said access multiplexer-side transceivers and said customer-side transceivers, said processor comprising means for reducing crosstalk among said customer-related wire pairs. In some embodiments, vectoring is used for the crosstalk reduction, thus implementing a so-called cable level vectoring (CLV).

20 Claims, 5 Drawing Sheets

CABLE-LEVEL CROSSTALK REDUCTION

CROSS-REFERENCE TO RELATED APPLICATIONS

This application is a National Phase Application of PCT International Application No. PCT/IL2012/050550, International Filing Date Dec. 23, 2012, claiming priority of US Provisional Patent Application No. 61/579,916, filed Dec. 23, 2011, both of which are hereby incorporated by reference.

BACKGROUND OF THE INVENTION

One of the most effective and efficient methods of deploying high-speed digital services to business and residential customers is to use one of the many forms of DSL (Digital Subscriber Loop) technologies over the copper wires originally used for delivering telephone service. This approach has become very popular in the last 20 years due to the fact that copper wires are already deployed almost everywhere, and are quite easy to access at the Central Office (CO), at the cabinet or Remote Terminal (RT), and at the customer premises (CP).

In typical DSL deployments, a communication link is established between two transceivers connected to each other by a copper wire pair, i.e., two copper wires twisted together. One transceiver is located either at the CO or at the RT, and will be referred to here as the Network Node Equipment (NNE) transceiver, and the other transceiver is located at the customer location, and will be referred to here as the Customer Premise Equipment (CPE) transceiver. Typically, a number of copper pairs may be enclosed in a single cable.

One of the main limitations of DSL technology is the significant spectral interference between DSL services deployed on different twisted copper pairs in the same cable. Spectral interference between different high-bitrate services in a copper cable is caused by the fact that each copper pair acts as an antenna. The signal transmitted on each copper pair, which is intended for the receiver located at the other end of that copper pair, is also inadvertently picked up by receivers connected to neighboring copper pairs, because those pairs are not individually shielded from each other. These inadvertently received signals appear as additional noise on the receivers of neighboring pairs, thereby reducing the Signal-to-Noise Ratio (SNR) and corresponding data capacity of those receivers. This creates the well-known phenomenon of "crosstalk", aptly named for the effect it caused in the early days of the telephone, when the telephone discussion taking place on one line could sometimes be overheard by the people conversing on a different line.

Due to the physical characteristics of copper pairs, and in particular due to the average length of the twist between the two copper wires making up each pair, the crosstalk coupling between different pairs increases exponentially with the frequency of the transmitted signal. But this crosstalk coupling between copper pairs is only one of the three factors that determine the strength of crosstalk; the other two are the strength of the disturbing transmitter (typically referred to as a "disturber") and the sensitivity of the disturbed receiver (typically referred to as a "victim") at any given frequency. For example, if the frequency band of the signals transmitted by the disturber is different than the frequency band of the signals received by the victim, then there will typically be almost no crosstalk, and therefore no impact on the data capacity of the victim.

Crosstalk typically consists of Near-End Crosstalk (NEXT), caused by disturbers located at the "near-end", i.e., on the same side (network side or customer side) of the copper loop as the victim's receiver, and Far-End Crosstalk (FEXT), caused by disturbers located at the "far-end", i.e., on the opposite side of the copper loop from the victim's receiver.

The severe deterioration in the data capacity of DSL services due to crosstalk has sparked significant innovation in crosstalk-reduction methods. These methods typically aim to reduce self-crosstalk and/or alien crosstalk, which for the purposes of this document are defined as follows: "Self-crosstalk", consisting of Self-NEXT and Self-FEXT, is generated by transmitters connected to other lines that are physically connected to the same DSL equipment as the victim's line on at least one side of the loop (i.e., on the NNE side or the CPE side). "Alien crosstalk", consisting of Alien NEXT and Alien FEXT, is generated by transmitters connected to lines that are physically connected to different DSL equipment than the victim's line on both sides of the loop (i.e., on both the NNE side and the CPE side).

In the case of self-crosstalk, the fact that the disturbing lines and disturbed lines are connected to the same DSL equipment implies that the signals transmitted on the disturbing lines are known. This means that the disturbed lines can take advantage of that knowledge to essentially cancel self-crosstalk. This basic principle has been implemented in various forms of self-crosstalk cancellation, for example in Self-NEXT cancellation for Gigabit Ethernet and SHDSL (Single-pair High-Speed DSL). The technology of interest in this case, however, is VDSL (Very-high-speed DSL), which uses different frequency bands for upstream and downstream transmission. Therefore, lines that carry VDSL services do not generate Self-NEXT with respect to each other.

The data capacity of copper wires decreases significantly as the length of the copper loop increases. Therefore, in order to deliver very high data rates, VDSL services are typically deployed on very short loops. The length of the copper loops is typically decreased by deploying the NNE in a cabinet or RT that is connected to the CO via a fiber link. The customers located close to the RT are connected to the NNE over their shortened copper loops.

Since FEXT emanates from disturbers located on the opposite side of the copper loop from the victim's receiver, its effect also decreases significantly as the length of the copper loop increases. Therefore, on the short loops used by VDSL services, Self-FEXT is not attenuated and becomes a significant concern.

In recent years, the concept of "vectoring" has been developed for cancelling Self-FEXT between VDSL links that are connected to the same VDSL access multiplexer (VDSLAM) on the NNE side but different VDSL modems on the CPE side. This means that vectoring can be used to cancel Self-FEXT between DSL lines serving different customer locations, as long as they originate from the same VDSLAM on the NNE side of the loop. Vectoring utilizes the fact that all the disturbing signals are available in the NNE location, either on the transmitter side for downstream signals, or on the receiver side for upstream signals. Therefore, downstream Self-FEXT can be cancelled by precoding the transmitted signals with crosstalk-cancelling additional signals, and upstream Self-FEXT can be cancelled by decoding the received signals and subtracting the crosstalk effects of each of those received signals from the other received signals. Vectoring has already been standardized by the International Telecommunications Union (ITU), and offers great promise for significant improvement of data rates on VDSL link.

Unfortunately, carriers across the world appear hesitant to deploy vectoring in their networks. One principal concern is due to the inability of vectoring to deal with the effects of Alien FEXT. In the case of alien crosstalk, the modems on the victim lines do not have access to the signals transmitted on the disturber lines. Therefore, alien crosstalk cannot be cancelled, as with Self-FEXT. However, the effects of alien crosstalk can be mitigated by correlating the received crosstalk noise across multiple receivers, and removing the correlated part of the noise from at least some of these receivers, thereby increasing the data capacity of the corresponding lines. This type of correlation-based scheme can result in noticeable performance benefits as long as the number of crosstalk sources (i.e., the number of disturbing alien transmitters) is lower than the number of disturbed receivers whose noises are correlated.

The problem with known correlation-based alien crosstalk mitigation methods is that they are not effective in typical VDSL deployments. Consider the simple example illustrated in FIG. 1, in which a single cabinet 1100 contains two VDSLAMs with vectoring, 1110 and 1120, deployed by two different carriers. Each of customers 1400A, 1400B, 1400C, and 1400D, may be connected to a VDSLAM by a twisted copper pair, e.g., 1212, 1214, 1222, and 1224), which run through cables 1210 and 1220. A switch, 1130 is connected to VDSLAMs 1110 and 1120.

Since each customer is free to select either of the two carriers to deliver VDSL service to their home, each of the two VDSLAMs 1110 and 1120 could be connected to any customer 1400A-D in the vicinity of the cabinet 1100. Therefore, any VDSL link operated by one carrier out of its own VDSLAM is likely to be affected by alien crosstalk generated by VDSL links operated by the other carrier out of the other VDSLAM. For example, customer 1400A, which is served by VDSLAM 1110, delivered on twisted copper pair 1212 located in cable 1210 is affected by downstream FEXT 1343 by and upstream FEXT 1346 from twisted copper pair 1214. However, since the VDSL link on copper pair 1214 is served by VDSLAM 1120, it is alien FEXT. The alien FEXT 1343 and FEXT 1346 cannot be cancelled by VDSLAM 1110 because the signals are not known to VDSLAM 1110. Similarly, for example, customer 1400D, which is served by VDSLAM 1120, delivered on twisted copper pair 1224 located in cable 1220 is affected by downstream FEXT 1353 by and upstream FEXT 1356 from twisted copper pair 1222. However, since the VDSL link on copper pair 1222 is served by VDSLAM 1110, it is alien FEXT. The alien FEXT 1353 and FEXT 1356 cannot be cancelled by VDSLAM 1120 because the signals are not known to VDSLAM 1120.

In the downstream direction, i.e., from the NNE to the CPE, the victim receivers are located at the CPE, and the vast majority of VDSL links use only one such CPE receiver. Therefore, there are no multiple receivers across which the alien crosstalk signals could be correlated and their effect mitigated. Even in the rare cases where there are two, three, or even four receivers located at the CPE (for example, in the case of bonding multiple copper pairs together to deliver even higher data rates), the number of disturbing alien crosstalk transmitters is in most cases equal to or higher than the number of collocated CPE receivers, thereby negating the benefits of alien crosstalk mitigation.

In the example of FIG. 1, the presence of alien FEXT between VDSLAMs 1110 and 1120 implies that vectoring will on average be able to cancel only about half of the disturbers for each victim (since the other half are likely to be connected to the other VDSLAM), resulting in an approximate SNR gain of 3 dB. This SNR gain is much lower than typical SNR gains of 15-30 dB that can be achieved by vectoring in the absence of alien FEXT.

The above example illustrates the dramatic reduction in the benefits of vectoring that can result from alien FEXT. What this means to carriers is that they might go through the significant effort and expense of upgrading their VDSL equipment to support vectoring, only to see the resulting benefits disappear when a different carrier deploys another VDSLAM out of the same cabinet.

The same problem may arise even when both VDSLAMs 1110 and 1120 belong to the same carrier, because technology for vectoring across multiple VDSLAMs has not yet been developed. Moreover, even if it is eventually developed, it may prove to be too expensive and too cumbersome to deploy.

One proposed remedy for the alien crosstalk where both VDSLAMs are operated by the same carrier, is so-called "binder management." To better understand this concept, let us examine the nature of crosstalk in telephone wires. As previously mentioned, one of the three factors that determine the strength of crosstalk between a disturber and a victim is the crosstalk coupling between the two corresponding copper pairs, namely the copper pair connected to the disturber and the copper pair connected to the victim. Copper pairs are arranged in bundles referred to as "binders", with each binder typically containing 10-50 copper pairs. A cable may contain just a single binder, or it may contain multiple binders. The total number of copper pairs in a cable depends greatly on the location from which the cable is deployed. Cables originating from the CO may contain hundreds or even thousands of copper pairs, while cables originating from the cabinet typically contain no more than one hundred copper pairs.

The key difference between cables and binders from the point of view of crosstalk has to do with the shielding method: cables are almost always wrapped in metal shielding that essentially eliminates any crosstalk coupling between copper pairs in different cables. Binders, on the other hand, are not individually shielded, and therefore the crosstalk coupling between copper pairs in different binders that belong to the same cable may be as strong as or even stronger than the crosstalk coupling between copper pairs in the same binder.

Thus, in the example of FIG. 1, copper pairs 1212 and 1214 belong to the same cable 1210, and therefore they generate crosstalk 1343 and 1346 to each other. Similarly, copper pairs 1222 and 1224 belong to the same cable 1220, and therefore they generate crosstalk 1353 and 1356 to each other. However, there is essentially no crosstalk generated from copper pairs 1212 and 1214 to copper pairs 1222 and 1224 or vice versa, since those copper pairs belong to different cables.

"Binder management" refers to the process of connecting copper pairs with strong crosstalk couplings to the same VDSLAM. The rationale behind this process is that since FEXT cannot be cancelled across different VDSLAMs, it is preferable to connect all the copper pairs that generate crosstalk to each other to the same VDSLAM.

FIG. 2 illustrates the process of binder management, where all the pairs from each cable are connected to respectively separate VDSLAMs. In this example, each of customers 2400A, 2400B, 2400C, and 2400D, may be connected to a VDSLAM by a twisted copper pair, e.g., 2212, 2214, 2222, and 2224), which run through cables 2210 and 2220. According to the binder management arrangement, all pairs from cable 2210, e.g., cables 2212 and 2214, are connected to VDSLAM 2110, and all the pairs from cable 2220, e.g., cables 2222 and 2224, are connected to VDSLAM 2120. A switch, 2130 is connected to VDSLAMs 2110 and 2120.

It will be observed that in the system of FIG. 2, by virtue of the binder management arrangement, alien crosstalk is eliminated. For example, customer 2400A, which is served by VDSLAM 2110, delivered on twisted copper pair 1212 located in cable 1210 is affected by downstream FEXT 2343 by and upstream FEXT 2346 from twisted copper pair 2214. Since the VDSL link on copper pair 1214 is served by the same VDSLAM, i.e., VDSLAM 2110, it is self-FEXT, and therefore, may be cancelled by VDSLAM 2110 using vectoring, because the signals are known to VDSLAM 2110. Similarly, for example, customer 2400D, which is served by VDSLAM 2120, delivered on twisted copper pair 2224 located in cable 2220 is affected by downstream FEXT 2353 by and upstream FEXT 2356 from twisted copper pair 2222. Again, since the VDSL link on copper pair 2222 is served by the same VDSLAM, i.e., VDSLAM 2120, it is self-FEXT, and may be cancelled by VDSLAM 2120 using vectoring, because the signals are known to VDSLAM 2120.

Unfortunately, this process is currently not feasible for carriers for at least two reasons. First, the technician connecting a new VDSL customer would have to figure out which of the existing VDSL customers would be disturbed by the new VDSL link, and then decide which of the two or more VDSLAMs should be used to connect the new customer. However, this information is not typically available to a technician in the field. Second, even if this were possible, DSL technicians commonly move customers to different pairs in order to correct problems with the service. Therefore, each time a technician wanted to move a customer to a different pair, he would have to figure out which VDSLAM the new pair should be connected to, and then re-provision the service of the customer out of the new VDSLAM, resulting in significantly higher operating expenses for the carriers, and much longer service disruptions for the customers.

Therefore, it is desirable to find a solution to the problem of alien FEXT that does not involve binder management or the use of vectoring across different VDSLAMs.

SUMMARY OF EMBODIMENTS OF THE INVENTION

The present invention, in embodiments thereof, provides, in a generalized topology, a device for managing signal transport, on a cable level, in a communication system. In the generalized topology, the device is connectable between one or more access multiplexers and a cable that form part of the communication system. The device includes the following components: a plurality of access multiplexer-side transceivers connectable to access multiplexer-related physical medium, associated with said one or more access multiplexers; a plurality of customer-side transceivers connectable to respective customer-related wire pairs of said cable; and a processor connected to said access multiplexer-side transceivers and said customer-side transceivers, said processor comprising means for reducing crosstalk among said customer-related wire pairs.

It is understood that an "access multiplexer" as described herein should be interpreted broadly and includes, without limitations, both Very-high-speed Digital Subscriber Loop Access Multiplexers (VDSLAM) and switches, such as optical switches.

According to one topology, the aforementioned one or more access multiplexers include VDSLAMs located in a VDSLAM cabinet. According to the aforementioned topology, the VDSLAMs are connected directly to the proposed device.

According to another topology at least one of the aforementioned access multiplexers is a Very-high-speed Digital Subscriber Loop Access Multiplexer (VDSLAM), wherein at least one of the aforementioned access multiplexers is a switch (e.g., optical switch), wherein said access multiplexer-related physical medium includes wire pairs connecting the at least one VDSLAM with at least one of the access multiplexer-side transceivers and, in a case of an optical switch, at least one optical fiber connecting the at least one switch with at least one of the access multiplexer-side transceivers. According to the aforementioned topology, some of the transceivers are connected directly to the switch whereas other are first connected to the VDSLAM and then to the switch.

According to yet another topology, the aforementioned one or more access multiplexer is an optical switch, wherein said access multiplexer-related physical medium comprises at least one optical fiber connecting the at least one optical switch with at least one of the access multiplexer-side transceivers. According to the aforementioned topology the device might be viewed as VDSLAM, however, as mentioned above it is possible to connect it (in the future) to another VDSLAM (from different vendor, different carrier or possibly similar VDSLAM but with no additional interfaces beside the wire pairs) without losing any of the benefits of crosstalk reduction suggested by the device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
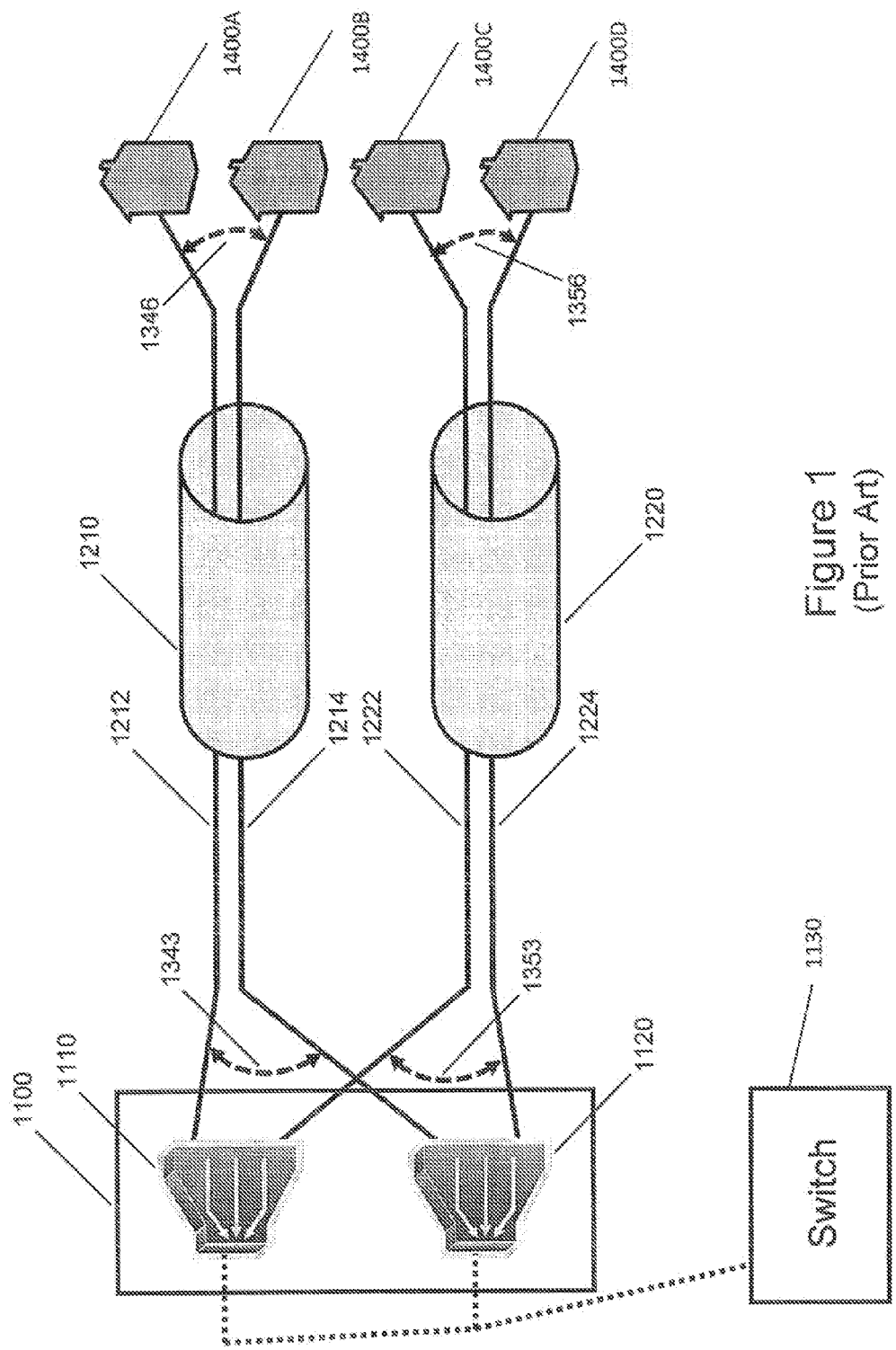
FIG. 1 is a schematic illustration of a prior art system including a cabinet containing two VDSLAMs with vectoring, deployed by two different carriers.
Figure 2:
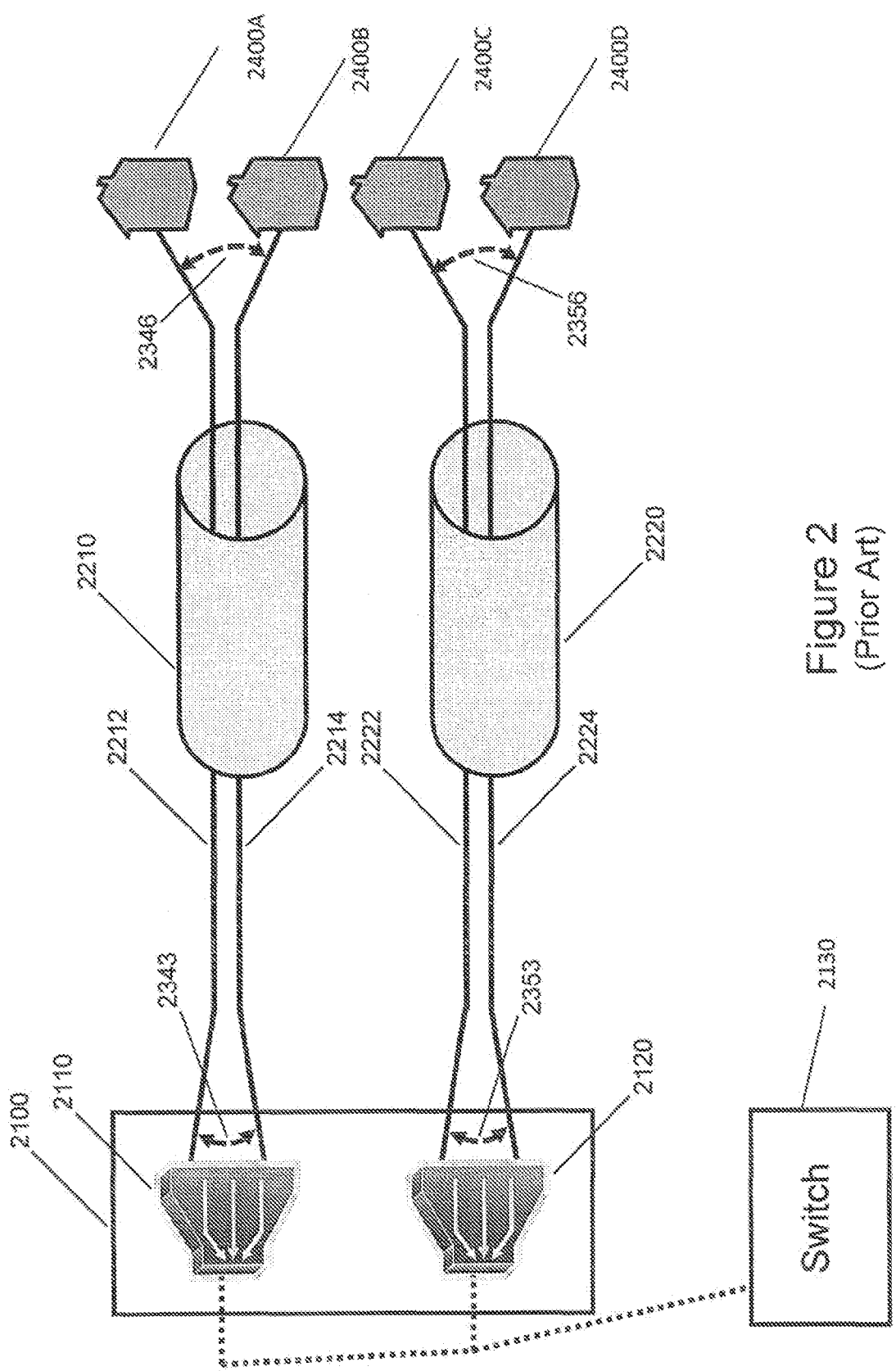
FIG. 2 is a schematic illustration of a prior art system utilizing binder management.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention, in embodiments thereof, provides a crosstalk reduction device and method of use thereof that may serve to allow crosstalk reduction (and possibly cancellation, such as by vectoring) even where multiple VDSLAMs are connected in the same cabinet. A device according to embodiments of the present invention may be deployed for each cable, thereby allowing operation of crosstalk reduction at the level of an individual cable. The device may include a plurality of cabinet-side transceivers for being connected to respective access multiplexer (e.g. VDSLAM wire pairs and switch fiber optics), a plurality of customer-side transceivers for being connected to respective customer wire pairs of a cable, and a processor connected to the cabinet-side transceivers and the customer-side transceivers, the processor performs crosstalk reduction among the customer wire pairs of the cable.

It is noted that there are several options to carry out crosstalk reduction by the device according to embodiments of the present invention. In a case of self crosstalk (cable-wise) vectoring can used to cancel the self crosstalk. In a case that vectoring cannot be used (in case of non-vectoring CPEs for example), alien cancellation can be performed at the device to reduce the crosstalk from these pairs to the vectoring group. Additional signal manipulations can be performed by this device to reduce the impact of crosstalk such as PSD manipulation. For example, in case of pairs with non-vectoring CPE, the PSD of the non-vectoring link can by reduced such that the intersection in the frequency domain with the vectoring group will be reduced and thus its impact on the vectoring group will be minimized. Other, more complicated manipulations might also be used by this device.

According to some embodiments of the invention, the crosstalk reduction engine may be configured to process signals substantially on the physical layer.

According to some embodiments of the invention, the crosstalk reduction engine may include vectoring engine that may be configured to provide vectoring for cancelling downstream self-crosstalk by: receiving signals from the VDSLAMs over the VDSLAM wire pairs; precoding the received signals with crosstalk-cancelling additional signals; and transmitting the precoded signals on the customer wire pairs.

According to some embodiments of the invention, the crosstalk reduction engine may include vectoring engine that may be configured to provide vectoring for cancelling upstream self-crosstalk by: receiving signals over the customer wire pairs; post-coding the received signals with crosstalk-cancelling additional signals; and transmitting the post-coded signals to the access multiplexers over the respective physical medium.

The present invention includes a system, method and apparatus for reducing or eliminating alien FEXT in VDSL deployments, thereby allowing carriers to optimize potential benefit from deploying vectoring technology.

According to embodiments of the invention, there is provided a vectoring-enabled device, referred to herein as a vectoring service extender (VSE) or VSE device. It should be noted that although vectoring is the preferred crosstalk reduction scheme, many other crosstalk reduction schemes known in the art may be also carried out in conjunction with the VSE described herein. Therefore, 'vectoring' as mentioned in this application should not be regarded as a limiting term.

The VSE devices of the present invention serve to allow vectoring even where multiple VDSLAMs are collocated in the same cabinet. The VSEs of the present invention may be deployed for each cable, thereby allowing operation of vectoring at the level of an individual cable. It will be recalled that because the cables are wrapped in metal shielding, any crosstalk coupling between copper pairs in different cables is essentially eliminated. Therefore, as described below, VSE devices according to some embodiments of the invention may comprise or include at least one VDSL repeater with vectoring functionality.

Embodiments of the present invention may be used in connection with a cabinet with an arbitrary number of VDSLAMs installed in it and an arbitrary number of cables connecting the cabinet to any number of customer homes or businesses in the area served by the cabinet. In this case, the present invention may be deployed as described below.

Each VSE may comprise multiple modules that communicate with each other to allow the carrier to match the total number of ports in each VSE unit to the number of copper pairs in the cable connected to the VSE device. For example, if the cabinet is connected to some 50-pair cables and some 100-pair cables, the carrier may connect each 50-pair cable to a 48-port VSE device and each 100-pair cable to a 96-port VSE device. A 48-port VSE device may comprise two modules: one NNE module that includes 48 NNE transceivers and one CPE module that includes 48 CPE transceivers. A 96-port VSE device may comprise two NNE modules and two CPE modules.

In operation, in order to connect the VSE device, each of the cables may be cut shortly before it enters the cabinet, and all the pairs of each cable are connected to a single VSE device. The customer-side of the cut cable may be connected to the NNE transceivers of the VSE, which establish new VDSL links with the VDSL CPE transceivers located at each customer's home. The cabinet-side of the cut cable may be connected to the CPE transceivers of the VSE, which establish new VDSL links with the NNE transceivers of both VDSLAMs located inside the cabinet.

According to an embodiment of the invention, the NNE transceivers of the VSE may be vectoring enabled, with vectoring operating across all NNE transceivers, e.g., across all 48 NNE transceivers in a 48-port VSE device, and across all 96 NNE transceivers in a 96-port VSE device. The CPE and NNE transceivers of the VSE device may be fully standards-compliant and interoperable with any standards-compliant NNE and CPE transceivers, respectively. Accordingly, the VSE device may establish VDSL links with any standards-compliant access multiplexer deployed in the cabinet and any standards-compliant VDSL modem installed at the CPE.

The processing of VDSL signals by the VSE may be limited to the physical layer. Thus, for example, in the downstream direction, the physical layer signals transmitted by the NNE transmitters of the VDSLAMs in the cabinet are received by the CPE receivers of the VSE device, pre-coded for FEXT cancellation by the vectoring engine of the VSE device, and then retransmitted with the vectoring precoding by the NNE transmitters of the VSE device. These pre-coded signals may then be received by the CPE receivers at the customer locations.

Similarly, in the upstream direction, the physical layer signals transmitted by the CPE transmitters at the customer locations are received by the NNE receivers of the VSE device, post-coded for FEXT cancellation by the vectoring engine of the VSE device, and then retransmitted with the vectoring post-coding by the CPE transmitters of the VSE device. These post-coded signals may then be received by the NNE receivers of the VDSLAMs in the cabinet.

Accordingly, the VSE device according to embodiments of the present invention may provide the full benefits of vectoring to any customer who uses a standards-compliant vectoring-enabled CPE transceiver, while also operating in non-vectored mode with any CPE transceiver that is not vectoring-enabled.

Figure 3A:
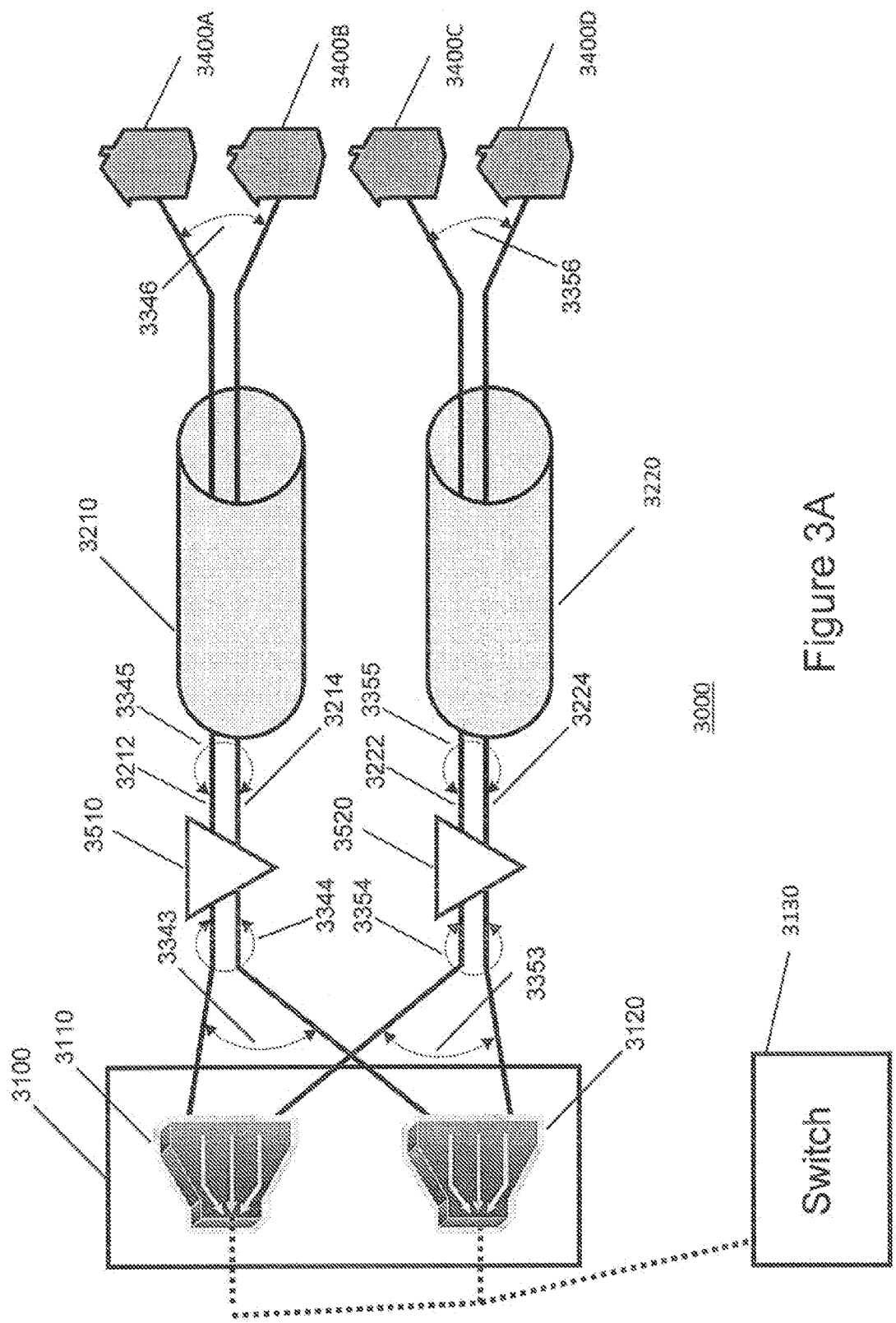
FIG. 3A is a schematic illustration of a system according to the present invention, in which crosstalk reduction devices are respectively associated with each cable.

FIG. 3A depicts a system 3000 employing embodiments of the invention. In the illustrative example, the aforementioned configuration is used as an example, in which two access multiplexers 3110 and 3120 are deployed by two different carriers in the same cabinet 3100. By way of example only, access multiplexers 3110 and 3120 will be referred as VDSLAMs for purposes of the concrete example, but it should be understood that any type of access multiplexers may be used herein.

For purposes of illustration, it is assumed that the cabinet in question serves a neighborhood of 200 customers, including customers 3400A-D, using cables 3210 and 3220, each cable containing 100 copper pairs. For completeness of the illustration, a switch 3130 (such as an optical switch) is shown connected to one of the VDSLAMs 3120 in cabinet 3100.

According to embodiments of the invention, there may be provided two separate crosstalk reduction (VSE) devices 3510 and 3520, respectively connected to each of the two 100-pair cables 3210 and 3220 that emanate from cabinet 3100. According to embodiments of the invention, CRdevices 3510 and 3520 may comprise or include at least a 100-port VDSL repeater with crosstalk reduction functionality (e.g., vectoring functionality). As described below, the CRs may be connected by their cabinet-side ports to a plurality of VDSLAMs, and by their customer-side ports to a cable including pairs leading to customers. For example, CR3510 may be connected by its cabinet-side ports to VDSLAMs 3110 and 3120, and by its customer-side ports to cable 3210, including pairs 3212 and 3214, leading to customers 3400A and 3400B, respectively. Similarly, for example, VSE 3520 may be connected by its cabinet-side ports to VDSLAMs 3110 and 3120, and by its customer-side ports to cable 3220, including pairs 3222 and 3224, leading to customers 3400C and 3400D, respectively.

According to the embodiment of the invention shown, each VSE is connected on its customer-side ports to only one cable, and each cable is connected to only one VSE. However, it will be understood that other configurations are possible within the scope of the present invention. For example, a VSE may be connected by its customer-side ports to a plurality of cables. Thus, cables all of whose pairs are connected to a single VSE may obtain the benefits of the invention, since the VSE knows the signals on all pairs of that VSE, and may use crosstalk reduction schemes such as vectoring, to reduce or cancel the cross-talk between them. Thus, a VSE may be used to cancel crosstalk on a plurality of cables, so long as for each cable, all pairs are connected to a single VSE, and not to different VSEs.

Figure 3B:
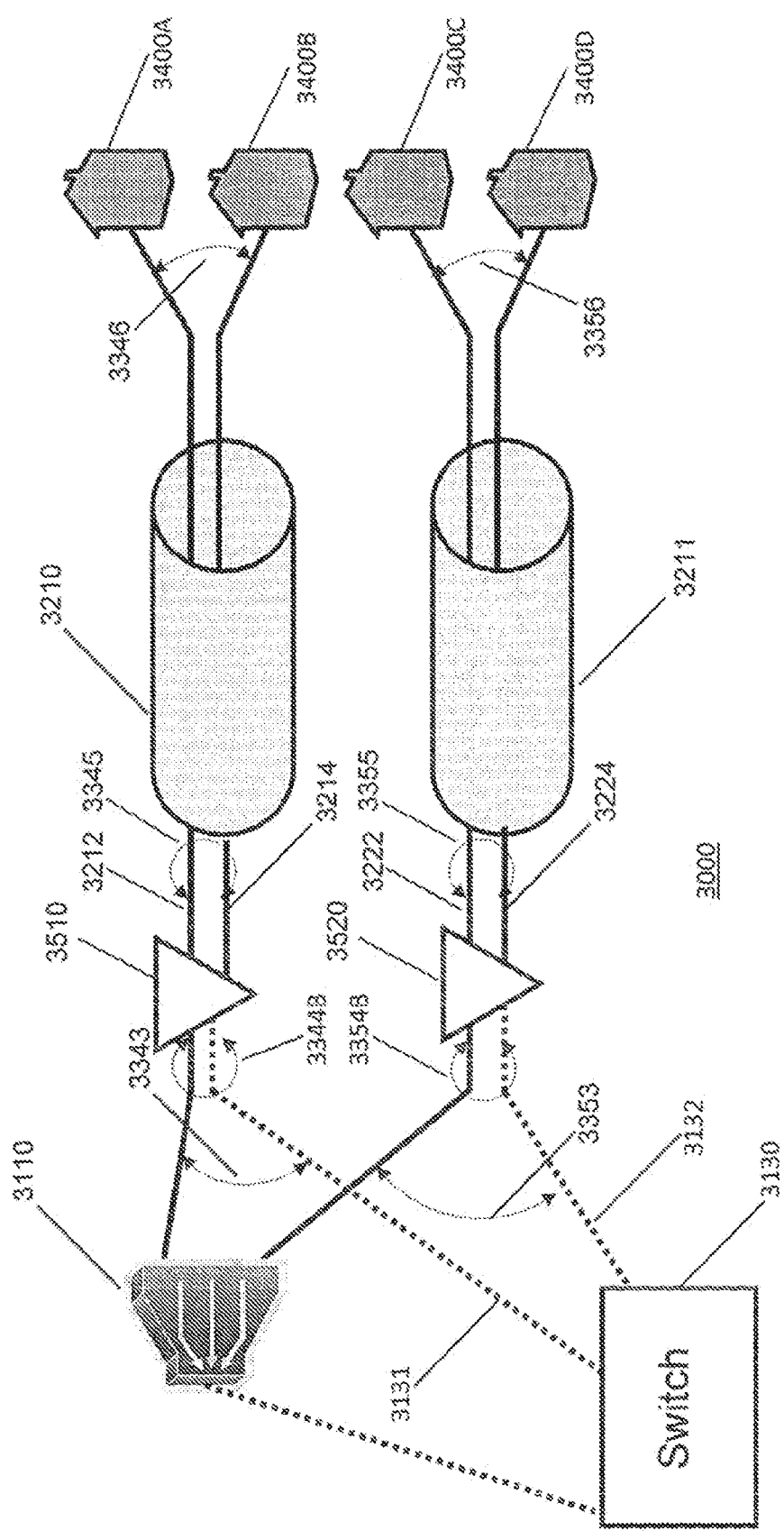
FIG. 3B is a schematic illustration of a system according to yet another embodiment of the present invention.

FIG. 3B depicts the aforementioned communication system 3000 as in FIG. 3A with a slightly different topology. According to the so called "hybrid" or "dual" illustrated here, the VSEs 3510 and 3520 are further connected directly to switch 3130, possibly via optical fibers 3131 and 3132.

According to this topology, at least one of the VDSLAMs is effectively bypassed. It should be noted, that in a particular case, all VDSLAMs may be bypassed so that the VSEs communicate directly with the respective switches. It should be further noted that for practical purposes, the hybrid or dual topology may be particularly advantageous in retrofitting into existing communication system as it provides more degrees of freedom from architecture point of view.

Figure 4:
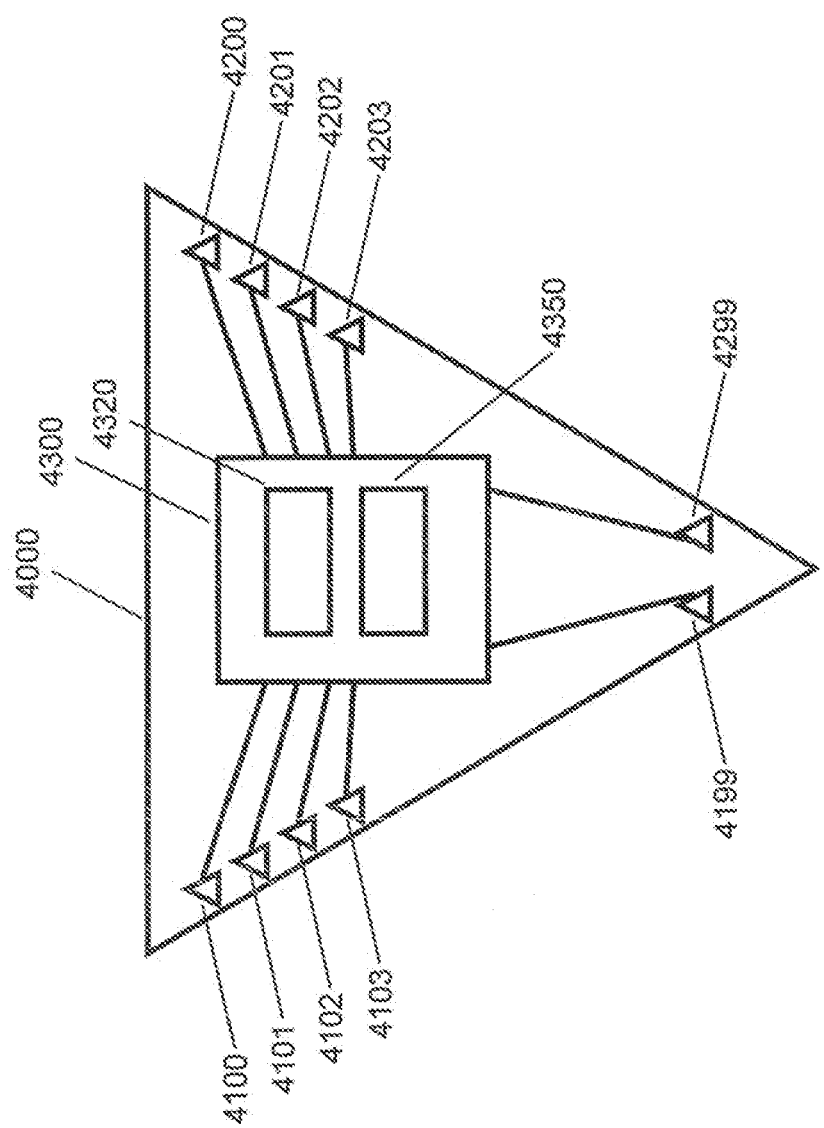
FIG. 4 is a schematic illustration of the architecture of a vectoring service extender (VSE) device according to an embodiment of the invention.

FIG. 4 depicts a schematic illustration of a vectoring service extender device (VSE) according to an embodiment of the present invention.

A VSE device 4000 according to an embodiment of the invention may include a plurality of CPE transceivers and a plurality of NNE transceivers. In the example provided, the VSE device is a 100-port device, and accordingly, there are 100 CPE transceivers, e.g., transceivers 4100, 4101, 4102, 4102 through 4199, and 100 NNE transceivers e.g., transceivers 4200, 4201, 4202, 4202 through 4299. In operation, in order to connect the VSE device, each of the cables is cut before entering the cabinet, and all pairs of each cable are connected to a respective VSE device. For example, referring back to FIG. 3A, each of the 100-pair cables 3210 and 3220 may be cut shortly before they enter the cabinet, and all the pairs of each cable may be connected to a respective VSE 3510 and 3520, each of which may be or include the circuitry substantially as shown in FIG. 4.

Each wire in the customer-side of a cut cable is connected to a respective one of NNE transceivers 4200 through 4299 of the VSE device 4000, which establish new VDSL links with the VDSL CPE transceivers located at each customer's home 3400. Likewise, each wire in the cabinet-side of the cut cable is connected to the CPE transceivers 4100 through 4199 of the VSE device 4000, which establish new VDSL links with the NNE transceivers of both VDSLAMs 3110 and 3120 located inside the cabinet 3100.

According to embodiments of the invention, NNE transceivers of the VSE device are vectoring-enabled. According to some embodiments of the invention, VSE device 4000 may include a processor 4300, which may include a means for reducing crosstalk such as a vectoring engine or module 4320, with vectoring operating across all NNE transceivers 4200 through 4299.

The CPE and NNE transceivers of the VSE device according to embodiments of the invention may be standards-compliant and interoperable with any standards-compliant NNE and CPE transceivers, respectively. Therefore, the VSE device 4000 can establish VDSL links with any standards-compliant VDSLAM deployed in the cabinet 3100 and any standards-compliant VDSL modem installed at the CPE 3400.

In an embodiment of the invention, the processing of VDSL signals by the VSE device 4000 may be limited to the physical layer.

Accordingly, in the downstream direction, the physical layer signals transmitted by the NNE transmitters of the VDSLAMs in the cabinet may be received by the VSE device's CPE receivers 4100 through 4199, pre-coded for FEXT cancellation by the VSE device's vectoring engine 4320, and retransmitted with the vectoring precoding by the VSE device's NNE transmitters 4200 through 4299. These pre-coded signals may then be received by the CPE receivers 3400 at the customer locations.

Similarly, according to embodiments of the invention, in the upstream direction, the physical layer signals transmitted by the CPE transmitters 3400 at the customer locations may be received by the VSE device's NNE receivers 4200 through 4299, post-coded for FEXT cancellation by the VSE device's vectoring engine 4320, and then retransmitted with the vectoring post-coding by the VSE device's CPE transmitters 4100 through 4199. These post-coded signals may then be received by the NNE receivers of VDSLAMs 3110 and 3120 in cabinet 3100.

The VSE device according to embodiments of the invention may therefore provide benefits of vectoring to any customer who uses a standards-compliant vectoring-enabled CPE transceiver, while also operating in non-vectored mode with any CPE transceiver that is not vectoring-enabled.

It will be recognized that by installing VSE devices close to the cabinet, each of the original DSL links is separated into two segments: one short segment (for example, 50 meters or less) extending between the VDSLAM and the VSE, and one long segment (for example, ranging from one hundred to a few hundred meters) extending between the VSE and the CPE. Accordingly, the overall data capacity of the segmented link is the lower of the data capacities of the two segments.

The data capacity of the short segment is typically very high, even if there is no vectoring enabled on that segment, because the main signal is not significantly attenuated by the short wires, and the FEXT level is very low due to the fact that adjacent copper pairs travel together for a very short distance. Referring back to FIG. 3A, both the downstream FEXT 3343 and 3353 and the upstream FEXT 3344 and 3354 are negligible on the short wire segments between the VDSLAMs 3110 and 3120 and the VSE devices 3510 and 3520.

The long segments, however, extending between the VSE devices 3510 and 3520 and the CPE transceivers 3400 will typically have a lower data capacity than the short segments, because the main signal is attenuated more by the longer wires, and the FEXT crosstalk noise is strong due to the fact that adjacent copper pairs travel together for a longer distance.

Therefore, the short segment typically does not limit the performance of the overall link, even if vectoring is not enabled on that segment. Vectoring on the long segment from the VSE device to the CPE essentially cancels the downstream FEXT 3345 and 3355 and the upstream FEXT 3346 and 3356 on these longer segments, and significantly increases the data capacity of the long segments and, therefore, the data capacity of the overall link.

According to embodiments of the invention, amplifiers might be easily added on the segment between the VSE devices 3510 and 3520 and the CPE transceivers 3400. Usually, adding amplifiers is normally problematic since it adds strong crosstalk in the middle of the line, and again, in case of two separate access multiplexers sharing the same cable, this additional crosstalk results in a very significant performance loss. When VSE devise is used, it is very simple to add these amplifiers since it results with a change in the coupling channel and thus the VSE device can to be configured to successfully reduce this high crosstalk, resulting with significant performance gain.

According to embodiments of the invention, since all the copper pairs from each cable are connected to the same VSE device, which enables vectoring across all its CPE-facing NNE transceivers, it is possible to cancel substantially all the FEXT emanating from all the wires in the same cable on the long segments from the VSE to the CPE units, even though the cables include pairs that carry data transmitted by different access multiplexers. Moreover, since each cable is individually shielded, there is substantially no FEXT emanating from the other cables, which means that there is substantially no alien FEXT to adversely impact the performance of vectoring.

Using VSE device embodiments of the present invention may bring benefits to carriers.

First, each carrier may realize the full potential benefit of vectoring in terms of increased data capacity, without worrying about future deployments of additional access multiplexers.

Second, there is no need for binder management, since the VSEs devices are connected to individual cables. Therefore, each of the ports in the two VDSLAMs inside the cabinet may now be connected to any copper pair without generating any appreciable alien FEXT to any of the DSL links connected to the other VDSLAM.

Third, the VDSLAMs installed in the cabinet need not themselves support vectoring, since there is no need to cancel FEXT on the short segments between the VDSLAM and the VSE. This means that carriers that have already deployed VDSLAMs without vectoring in their cabinets need not upgrade them to vectoring-enabled VDSLAMs, which may be costly.

In some embodiments of the present invention, each port in the VSE device may include a bypass relay, to allow signals to simply pass through the VSE without being processed or retransmitted. This allows DSL services other than VDSL to continue to operate through a VSE device, while ensuring that, should those services be upgraded to VDSL at some time in the future, they may also benefit from the full vectoring functionality of the VSE device without creating any alien FEXT to existing VDSL services.

To determine whether or not to engage the bypass relay, the CPE transceiver of the VSE may try to detect a VDSL-specific handshake signal emanating from the NNE transceiver in the cabinet. If that VDSL-specific handshake signal is present, then the VSE treats this service as a VDSL service and processes it through its own transceivers; otherwise, it treats the signal emanating from the NNE transceiver as a non-VDSL service, and engages the bypass relay to route the corresponding non-VDSL signals through the bypass circuit without any processing by the VSE device, and particularly, without pre-coding or post-coding by the VSE device's vectoring engine.

In yet another embodiment of the present invention, the VSE may include an array of relays that can route the analog signals from any copper pair on the cabinet-side of the cable to any CPE transceiver of the VSE device. This would allow the VSE device operator to connect specific VDSLAM ports to specific CPE transceivers of the VSE device.

In yet another embodiment of the present invention, the VSE may include an electronic switch module 4350 operable to route the digital signals from any CPE transceiver of the VSE device to any NNE transceiver of the VSE device, and from any NNE transceiver of the VSE device to any CPE transceiver of the VSE device. This may allow the carrier to connect any copper pair from the cabinet-side of the cable to any CPE port of the VSE device, and any copper pair from the customer-side of the cable to any NNE port of the VSE device, without being concerned about keeping track of which copper pair is connected to which port. This may result in significant operational savings during the VSE device installation, since it may reduce the time needed to connect the copper pairs to the VSE device ports and may also eliminate the need to go back to correct any potential mistakes in the original wiring of the VSE device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A device for managing signal transport, on a cable level, in a communication system, wherein said device is connectable between one or more access multiplexers and a cable, said device comprising:
   a plurality of access multiplexer-side transceivers connectable to access multiplexer-related physical medium, associated with said one or more access multiplexers;
   a plurality of customer-side transceivers connectable to respective customer-related wire pairs of said cable; and
   a processor connected to said access multiplexer-side transceivers and said customer-side transceivers, said processor comprising means for reducing crosstalk among said customer-related wire pairs.

2. The device according to claim 1, wherein said one or more access multiplexers comprise Very-high-speed Digital Subscriber Loop Access Multiplexers (VDSLAM).

3. The device according to claim 1, wherein at least one of said access multiplexers is a Very-high-speed Digital Subscriber Loop Access Multiplexer (VDSLAM), wherein at least one of said access multiplexers is a switch, wherein said access multiplexer-related physical medium comprises: (a) wire pairs connecting the at least one VDSLAM with at least one of the access multiplexer-side transceivers and (b) at least one optical fiber connecting the at least one switch with at least one of the access multiplexer-side transceivers.

4. The device according to claim 1, wherein said one or more access multiplexers is a switch, wherein said access multiplexer-related physical medium comprises at least one optical fiber connecting the at least one switch with at least one of the access multiplexer-side transceivers.

5. The device according to claim 1, wherein said crosstalk comprises self-crosstalk.

6. The device according to claim 1, wherein said reducing crosstalk is carried out by cancelling said crosstalk.

7. The device according to claim 1, wherein said crosstalk comprises alien crosstalk.

8. The device according to claim 1, wherein said means for reducing cross talk comprises a vectoring engine, and wherein said reducing of crosstalk is carried out by vectoring.

9. The device according to claim 1, wherein said cable customer-related wire pairs, comprise one or more amplifiers.

10. The device according to claim 8, wherein said vectoring engine is configured to process signals substantially on a physical layer.

11. The device according to claim 8, wherein said vectoring engine is configured to provide vectoring for cancelling downstream self-crosstalk by:
    receiving signals from said access multiplexers over physical medium;
    precoding said received signals with crosstalk-cancelling additional signals; and
    transmitting said precoded signals on said customer-side wire pairs.

12. The device according to claim 8, wherein said vectoring engine is configured to provide vectoring for cancelling upstream self-crosstalk by:
    receiving signals over said customer-side wire pairs;
    post-coding said received signals with crosstalk-cancelling additional signals; and
    transmitting said post-coded signals to said access multiplexers over physical medium.

13. The device according to claim 1, further comprising an electronic switch module operable to route signals bi-directionally between any of said customer-side transceivers to any of said access multiplexer-side transceivers.

14. A method of managing signal transport, on a cable level, in a communication system, said method comprising:
    connecting a device between one or more access multiplexers and a cable, said device comprising:
    a plurality of access multiplexer-side transceivers connectable to access multiplexer-related physical medium, associated with said one or more access multiplexers;
    a plurality of customer-side transceivers connectable to respective customer-related wire pairs of said cable; and
    a processor connected to said access multiplexer-side transceivers and said customer-side transceivers, said processor comprising means for reducing crosstalk among said customer-related wire pairs.

15. The method according to claim 14, wherein said one or more access multiplexers comprise Very-high-speed Digital Subscriber Loop Access Multiplexers (VDSLAM).

16. The method according to claim 14, wherein at least one of said access multiplexers is a Very-high-speed Digital Subscriber Loop Access Multiplexer (VDSLAM), wherein at least one of said access multiplexers is a switch, wherein said access multiplexer-related physical medium comprises: (a) wire pairs connecting the at least one VDS LAM with at least one of the access multiplexer-side transceivers and (b) at least one optical fiber connecting the at least one switch with at least one of the access multiplexer-side transceivers.

17. The method according to claim 14, wherein said one or more access multiplexers is a switch, wherein said access multiplexer-related physical medium comprises at least one optical fiber connecting the at least one switch with at least one of the access multiplexer-side transceivers.

18. The method according to claim 14, wherein said crosstalk comprises self-crosstalk.

19. The method according to claim 14, wherein said reducing crosstalk is carried out by cancelling said crosstalk.

20. The method according to claim 14, wherein said crosstalk comprises alien crosstalk.

* * * * *